UNITED STATES PATENT OFFICE.

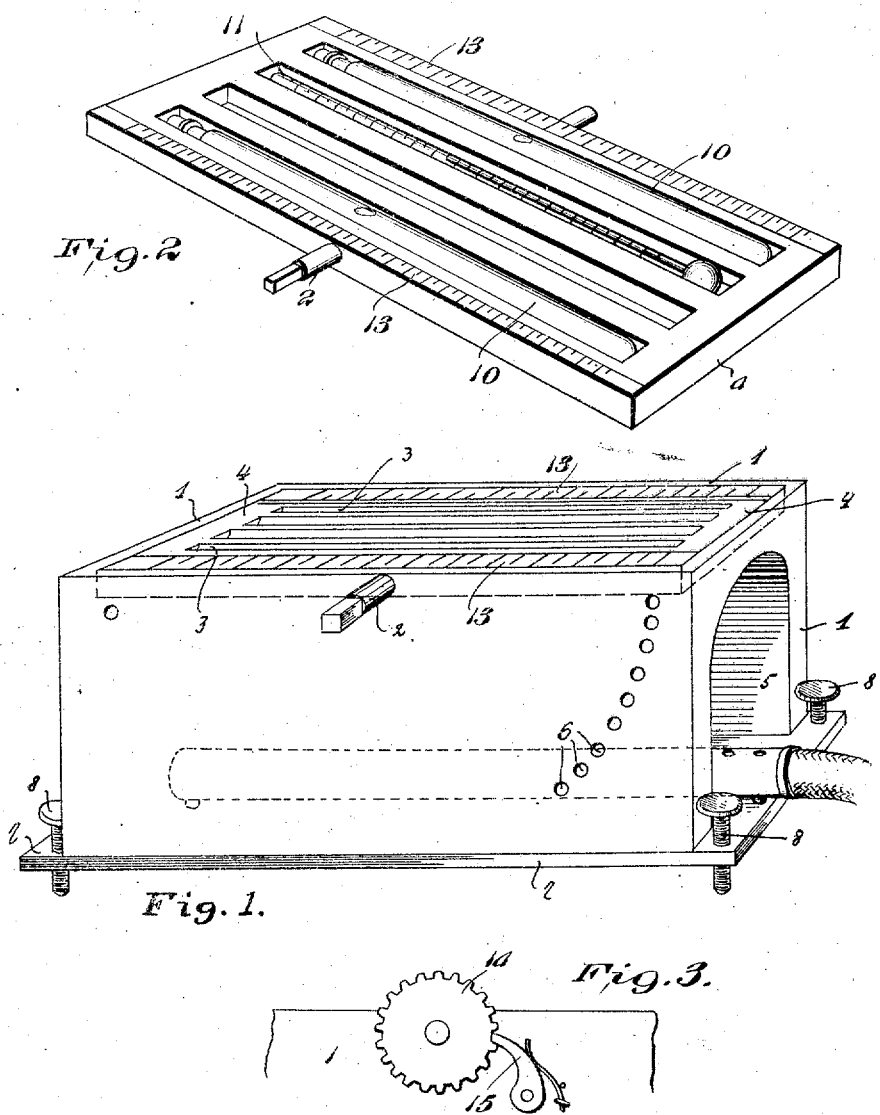

ANTON BALDUS, OF FRANKFORT-ON-THE-MAIN, GERMANY.

APPARATUS FOR MEASURING THE VISCOSITY OF LIQUIDS.

1,021,229.  Specification of Letters Patent.  Patented Mar. 26, 1912.

Application filed September 19, 1910. Serial No. 582,744.

*To all whom it may concern:*

Be it known that I, ANTON BALDUS, a subject of the German Emperor, and a resident of Frankfort-on-the-Main, Germany, have invented certain new and useful Improvements in Apparatus for Measuring the Viscosity of Liquids, of which the following is a specification.

My invention relates to improvements in apparatus for measuring the viscosity of liquids, and more particularly to apparatus of this class in which the viscosity of the liquid is determined by the velocity of an air bubble which rises within the liquid.

The object of the improvements is to provide an apparatus of this class which gives very accurate results, and which permits measurements to be made at any desired temperature of the liquid.

For the purpose of explaining the invention an example embodying the same has been shown in the accompanying drawing in which—

Figure 1 is a perspective view of an apparatus constructed in accordance with the present invention; Fig. 2 is a detail view of the pivotally mounted plate, showing two liquid containing tubes and a thermometer supported thereby; Fig. 3 illustrates a slight modification.

Referring to the example of the apparatus illustrated in the drawing, a metal frame or casing 1 carries, at its top, a metal plate 4 formed with grooves or slits 3 adapted to receive a tube or tubes 10 filled with the liquid the viscosity of which is to be determined, and a thermometer 11. The said plate and the tube or tubes located thereon can be heated to any temperature by any preferred means. In the example shown the casing is provided with an opening 5 through which a burner, for example a gas burner 12 can be inserted into the casing below the said plate. The plate 4 has a rocking support on the casing 1 by means of trunnions 2 which project laterally and through the wall of the casing. By means of the said trunnions the plate can be turned for which purpose in the form of the invention shown in Fig. 1 one of the trunnions is of square cross-section at its end, and is adapted to receive a key of corresponding form. On its surface the said metal plate is graduated as indicated at 13.

Within the side wall of the casing, in the form shown in Fig. 1 and near the end of the same bores 6 are provided which are adapted to receive a pin for supporting one end of the plate 4 when it is rocked about its axis into any desired inclined position. Thereby the viscosity of a liquid can be determined under various angular positions of the tubes. By heating the plate 4 the viscosity can be measured at any desired temperature. The bottom plate 7 of the frame is supported on set screws 8 by means of which the metal plate when in its normal position can be horizontally adjusted.

In order to measure the viscosity of a liquid, for example that of an oil, the tubes 10 are filled to about an inch from their upper ends with the oil, whereupon they are closed by means of a stopper. Care should be taken, that the stoppers extend into the tubes as nearly as possible the same distance, so that, in the horizontal position of the tubes, the bubbles formed by the air within the different tubes have the same length. The tubes are so adjusted on the plate 4 that the bubbles therein are opposite one of the graduations of the scales 13. After pushing the pin through one of the holes 6 the plate 4 is rocked about the trunnions 2, until it bears on the pin. Now the bubbles begin to ascend within the tubes, and the time is observed within which they pass through a certain distance. From the said distance and the time the velocity of the bubble is obtained by division, as is known in the art, and the velocity thus obtained is a measure for the viscosity of the liquid.

A modification of the means for setting the plate 4 in its rocked position is shown in Fig. 3 and consists in securing a circular plate 14 on one of the trunnions 2 which is formed with indentations adapted to be engaged by a locking hook 15 on the casing 1.

I claim herein as my invention:

1. In an apparatus for measuring or determining the viscosity of liquids, the combination of a tube like container for the liquid to be tested having a transparent side wall, and a carrier for said tube adapted to rock about an axis extending transversely of the length of the container and having a graduated section extending longitudinally of said tube, whereby the latter can be positioned to cause air therein to move longitudinally thereof and along said graduated section of the carrier in a form visible through said transparent side wall.

2. In an apparatus for measuring or determining the viscosity of liquids, the combination of a tube like container for the liquid to be tested having a transparent side wall, a carrier adapted to support the container and to rock about an axis extending transversely of the length thereof, and having adjacent the container a series of graduations, whereby the container can be positioned to cause air therein to move longitudinally of the container in a form visible through said transparent side wall, and the rate of movement of said air determined by said graduations, and means for heating the liquid.

3. In an apparatus for measuring or determining the viscosity of liquids, the combination of a suitable support, a carrier mounted upon said support to rock about a horizontal axis, and having formed on one surface a series of graduations, a tube like container for the liquid to be tested, having a transparent side wall, mounted on the carrier and extending across the aforesaid horizontal axis, and longitudinally of the scale formed by said graduations, whereby the position of said container can be varied to cause air therein to move longitudinally of the container in a form visible through said transparent side wall, and the rate of travel of which can be determined by aid of said scale, a thermometer on said carrier, and means for heating the liquid.

4. In an apparatus for measuring or determining the viscosity of liquids, the combination of a suitable support, a carrier plate mounted on said support to rock about a horizontal axis, and provided on its upper surface with a series of graduations, and a tube like container for the liquid to be tested, having a transparent side wall, and adapted to be mounted on the carrier plate adjacent the graduations thereon, whereby the container can be positioned to cause air therein to move longitudinally of the container past the graduations on the carrier plate.

5. In an apparatus for measuring or determining the viscosity of liquids, the combination of a hollow casing, a plate mounted to turn about a horizontal transverse axis at the top of the casing and having in its upper surface a longitudinally extending groove or recess, a tube like container for the liquid to be tested having a transparent side wall and adapted to be supported within said groove or recess, and means for holding said plate in an inclined position, for the purpose described.

6. In an apparatus for the purpose described, the combination of a hollow casing, a plate mounted to turn about a horizontal axis at the upper end of the casing and having a groove or recess formed in its outer surface and adapted to receive a tube containing the liquid to be tested, a heating device within the casing, and means for holding the plate in an inclined position.

7. In an apparatus for measuring or determining the viscosity of liquids, the combination of a suitable support, a carrier mounted on said support to turn about a transversely extending horizontal axis, a tube like container for the liquid to be tested, having a transparent side wall, supported by and extending longitudinally of said carrier, a toothed disk connected with the carrier concentric with said axis, and means on the support for engaging said disk to hold the carrier and liquid container in an inclined position, for the purpose described.

In testimony whereof I have signed my name to this specification in the presence of two subscribing witnesses.

ANTON BALDUS.

Witnesses:
FRANZ HASSLACHER,
ERWIN DEPPELY.